United States Patent [19]

Booher, et al

[11] Patent Number: 5,145,050
[45] Date of Patent: Sep. 8, 1992

[54] REVERSED CAN END EJECTION SYSTEM

[75] Inventors: Loodie M. Booher, Stanley L. Buchanan, both Bristol, Tenn.

[73] Assignee: Reynolds Metals Company, Richmond, Va.

[21] Appl. No.: 811,343

[22] Filed: Dec. 20, 1991

[51] Int. Cl.[5] .......................................... B65G 43/08
[52] U.S. Cl. .................................. 198/395; 198/398; 209/656; 209/928
[58] Field of Search ............... 198/395, 398; 209/656, 209/657, 928; 221/157, 163, 134

[56] References Cited

U.S. PATENT DOCUMENTS

| | | | |
|---|---|---|---|
| 1,652,032 | 9/1926 | Lynch | 221/157 |
| 2,410,037 | 10/1946 | Abbott | 198/398 X |
| 3,275,122 | 9/1966 | Carlson | 198/395 X |
| 3,433,966 | 3/1969 | Letch et al. | 198/395 X |
| 3,752,294 | 8/1973 | Harmon | 198/398 X |
| 3,776,377 | 12/1973 | Lane | 209/688 |
| 3,811,551 | 5/1974 | Eddy | 198/398 X |
| 4,655,350 | 4/1987 | Mojden et al. | 198/398 X |
| 4,977,998 | 12/1990 | Middeldorp | 198/398 X |

Primary Examiner—Robert P. Olszewski
Assistant Examiner—Cheryl L. Gastineau
Attorney, Agent, or Firm—Robert C. Lyne, Jr.

[57] ABSTRACT

A reversed can end ejector system for detecting and ejecting a can end in reverse orientation with respect to a moving stack of otherwise similarly aligned and nested can ends is disclosed. The system utilizes a reversed end extractor bar having a hook formed at a lower end thereof. The bar is supported above the stack with a support frame so that the hook is free to ride on a cylindrical exterior ridged surface of the stack. When a reversely oriented end is encountered, the hook is sized to drop by gravity into the peripheral gap formed between the reversed end and adjacent non-reversed end. The extractor bar is pivotally connected to a mounting bar which is in turn pivotally connected to the support frame whereupon further advancement of a reversed end with the stack during hooked engagement causes the reversed end to be lifted and removed from the stack via controlled rotation of the extractor bar relative to the mounting bar and then both as a unit relative to the support frame. A secondary reversed end extraction hook may be mounted to the support frame downstream from the primary extraction hook. A guide rod unit mounted to the support frame upstream from the primary hook is adapted to contact any partially raised ends within the stack to guide same back into co-elevational alignment with the stack.

19 Claims, 8 Drawing Sheets

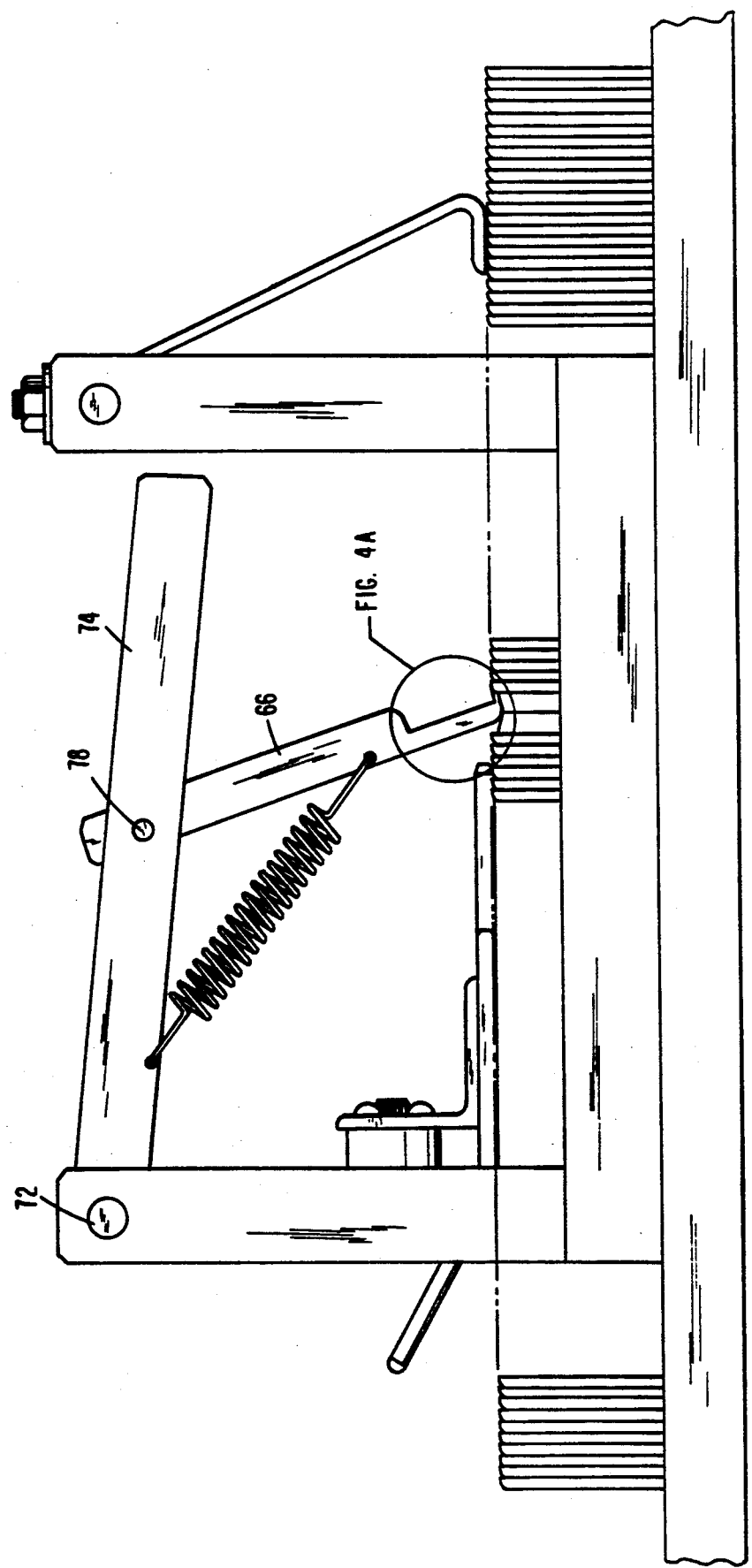

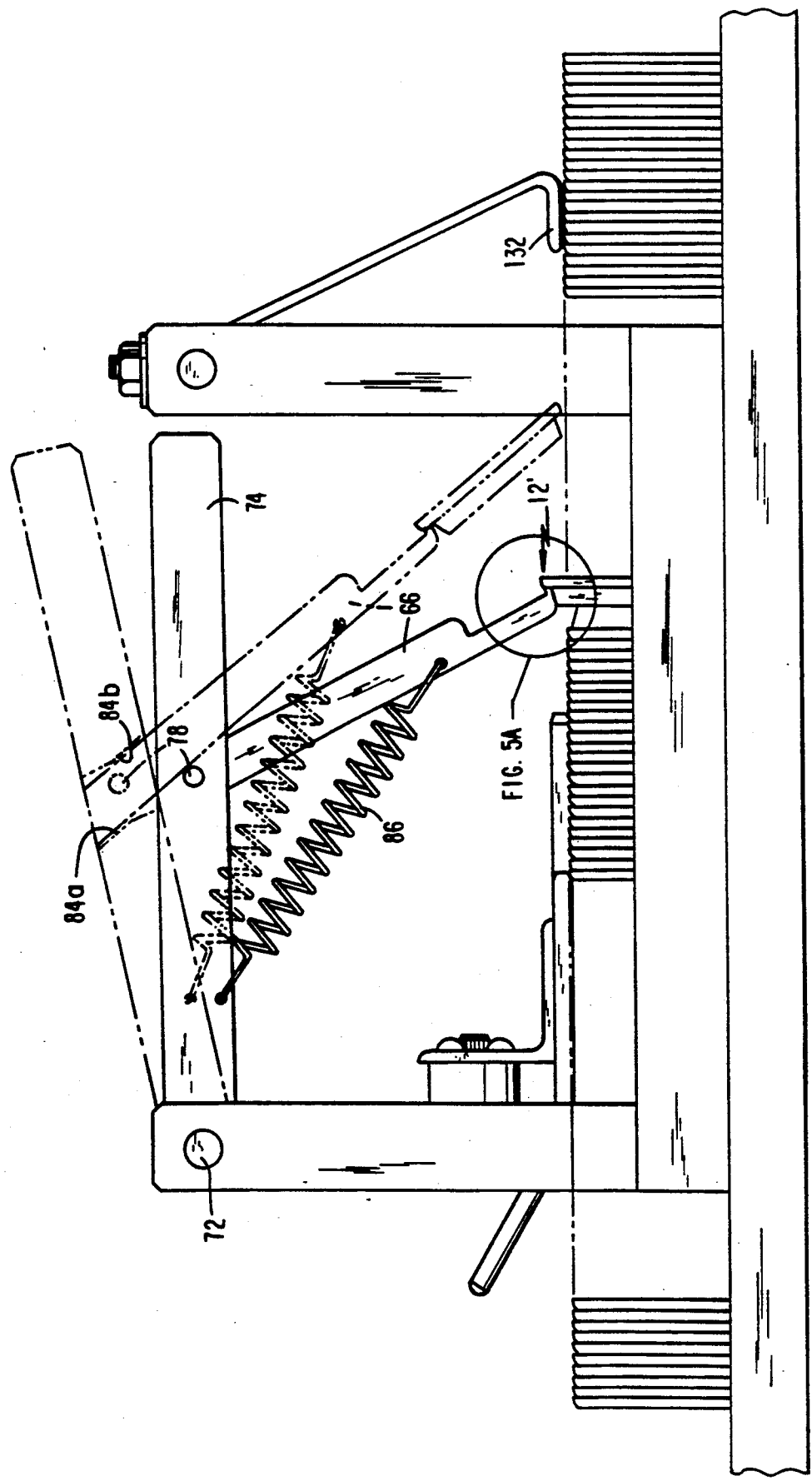

REVERSED CAN END EJECTION SYSTEM

TECHNICAL FIELD

The present invention relates generally to removal of disoriented or dissimilar objects from a conveyed arrangement of similar or like oriented objects and, more particularly, to removal of a reverse oriented can end from a stack of like oriented and nested can ends.

BACKGROUND ART

Can ends which are seamed to the outermost edge portions of cylindrical container bodies to form a beverage container are typically manufactured from metal stock, such as aluminum or steel sheet. First, a circular blank is cut from the sheet and formed between upper and lower reciprocating die assemblies in end-making machines (which are well known in the art) into the basic end configuration or "shell". After curling (by one of several well known techniques), the shell may be considered finished for some applications, but typically is further processed to include an easy-opening device, such as a ring pull tab or stay-on-tab. The term "end" will be used herein to refer to a shell, a finished end with an easy-opening device, and intermediate products in different stages of manufacture in between. Ends are sometimes called "lids".

The ends typically have a center panel of circular shape and a formed peripheral edge consisting of a countersink radius lip extending below the center panel and a seaming panel extending upwardly from the center panel. The seaming panel terminates in a curved peripheral flange located above the center panel and it is this flange which will be later seamed to a flange formed in the open end of the cylindrical container body.

It is customary in automated assembly facilities to utilize preformed and pre-stacked can ends. These nested stacks of can ends are usually provided in prepackaged form wherein an entire package is introduced into a generally tubular conveyor or conduit for feeding to a processing machine where they are attached to the container bodies.

Stripping and removal of packaging material from the nested stacks of can ends may sometimes cause various of the ends at or near the end of the stack to be dislodged or flipped within the stack and therefore lie in reverse orientation relative to the remaining ends in the stack and no longer nested. Obviously, an end placed in reverse orientation is no longer properly oriented and may not be accommodated by processing equipment. Indeed, such reversed ends, if fed into the processing equipment, may lead to a malfunction of such equipment.

Systems for detecting and ejecting reversed ends from a moving stack of otherwise similarly aligned and nested can ends are known. However, these systems generally rely upon relatively complicated mechanical systems or optical detection apparatus and electronic circuitry for producing a control signal to actuate complicated mechanical ejectors.

It is accordingly one object of the present invention to detect a reversed can end and eject same from a moving stack or line of can ends which are properly oriented prior to the point of introduction of the can ends into processing equipment.

Another object is to remove such reversed can ends utilizing a system which may be readily inserted into an existing conveyor line with only minimal if any modification thereto.

Another object is to provide a reversed end ejection system which is relatively simple and inexpensive in its design and manufacture but capable of reliable operation.

DISCLOSURE OF THE INVENTION

A method is disclosed for ejecting a can end in reverse orientation from a moving stack of otherwise similarly aligned and nested non-reversed can ends. When the ends are properly nested, each has an outermost peripheral surface which results in a stack having a cylindrical exterior ridged surface and wherein a reversely oriented end has an outermost peripheral surface which results in a peripheral gap with an adjacent end. The method comprises the steps of detecting a peripheral gap between a reversed end and an adjacent, non-reversed end. A hook is inserted into the peripheral gap to engage a peripheral flange of the reversed end. The reversed end is then removed from the stack via hooked engagement between the hook and peripheral flange.

Such removal preferably occurs by continued movement of the stack during hooked engagement which causes the hook to lift and remove the reversed end from the stack.

In the event the hook fails to enter into hooked engagement with the peripheral flange of the reversed end, the reversed end is typically in an elevated position relative to the stack. In accordance with a further feature of this invention, the method comprises the further step of detecting the presence of the reversed end in the elevated position relative to the stack and engaging a countersunk lip region of the reversed end with a secondary hook to completely lift and remove the reversed end from the stack.

A reversed can end ejection system is also disclosed for ejecting a can end in reverse orientation relative to a moving stack of otherwise similarly aligned and nested ends. These ends, when properly nested, each has an outermost peripheral surface which results in a stack having a cylindrical exterior ridge surface and wherein a reversely oriented end has an outermost peripheral surface which results in a peripheral gap with an adjacent end. The system comprises a support frame and reversed end extraction hook means mounted to the support frame. The hook means is normally disposed to contact the outermost peripheral surface of generally each said end in the stack during normal conveyance of said stack, including any said peripheral gap. The hook enters the peripheral gap and contacts a portion of the reversed end in hooked engagement. Continued movement of the stack during this hooked engagement causes the hook means to lift and remove the reversed end from the stack.

In accordance with a further feature of this invention, a secondary reversed end extraction hook is mounted to the support frame downstream from the primary extraction hook. In the event of failed hook engagement between the primary hook and the reversed end, the secondary hook is adapted to engage a portion of the now partially raised reversed end to lift same from the stack.

To ensure successful operation of this invention, a guide unit is mounted to the support frame, upstream from the reversed end extraction hook, to contact any reversed or non-reversed ends which are partially raised within the stack and guide same into co-elevational position with the stack before these ends contact the primary hook, which normally rides on the cylindrical exterior ridged surface of the properly elevationally positioned stack.

The reversed end extraction hook means preferably includes a hooked bar having a lower hooked end disposed above the stack. Mounting means is provided for mounting the hooked bar to the support frame so that the hooked end rides on the outermost peripheral surface of the stack. Such mounting means preferably includes means for enabling the hooked end to drop into the peripheral gap under the weight of the hooked bar.

Preferably, such mounting means includes a shaft mounted to the support frame to extend transversely above the stack. An overhead mounting bar is pivotally mounted to the shaft and extends rearward in the direction of conveyance. The hooked bar is pivoted at an upper end thereof to the mounting bar and projects downwardly towards the stack. The mounting bar and hooked bar are solely supported on the support frame by the shaft and the weight of the two bars is otherwise supported by contact with the stack.

The hooked end preferably includes a leading surface constructed to make smooth sliding contact with the exterior ridged surface of the stack. The hook is formed in a trailing portion of the lower end of the bar. The hook is sized, relative to the direction of conveyance, to normally ride on the ridged surface but to drop by gravity into the peripheral gap, which gap is larger than the size of the hook.

The hook preferably has a toe with at least one sharp corner adapted to effect a locking and wedging contact with an undercurl in the peripheral flange of the reversed end during continuous advancement of the stack. Further advancement of the stack causes pivoting movement of the hooked bar relative to the mounting bar and the mounting bar about the shaft to enable lifting and removal of the reversed end from the stack.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 4 is a sequential view similar to FIG. 3 depicting the relative positioning of various components of the ejection system during removal of the reversed end from the stack;

FIG. 5 is a further sequential elevational view similar to FIGS. 3 and 4 depicting final removal of the reversed end from the stack;

BEST MODE FOR CARRYING OUT THE INVENTION

Figure 1:
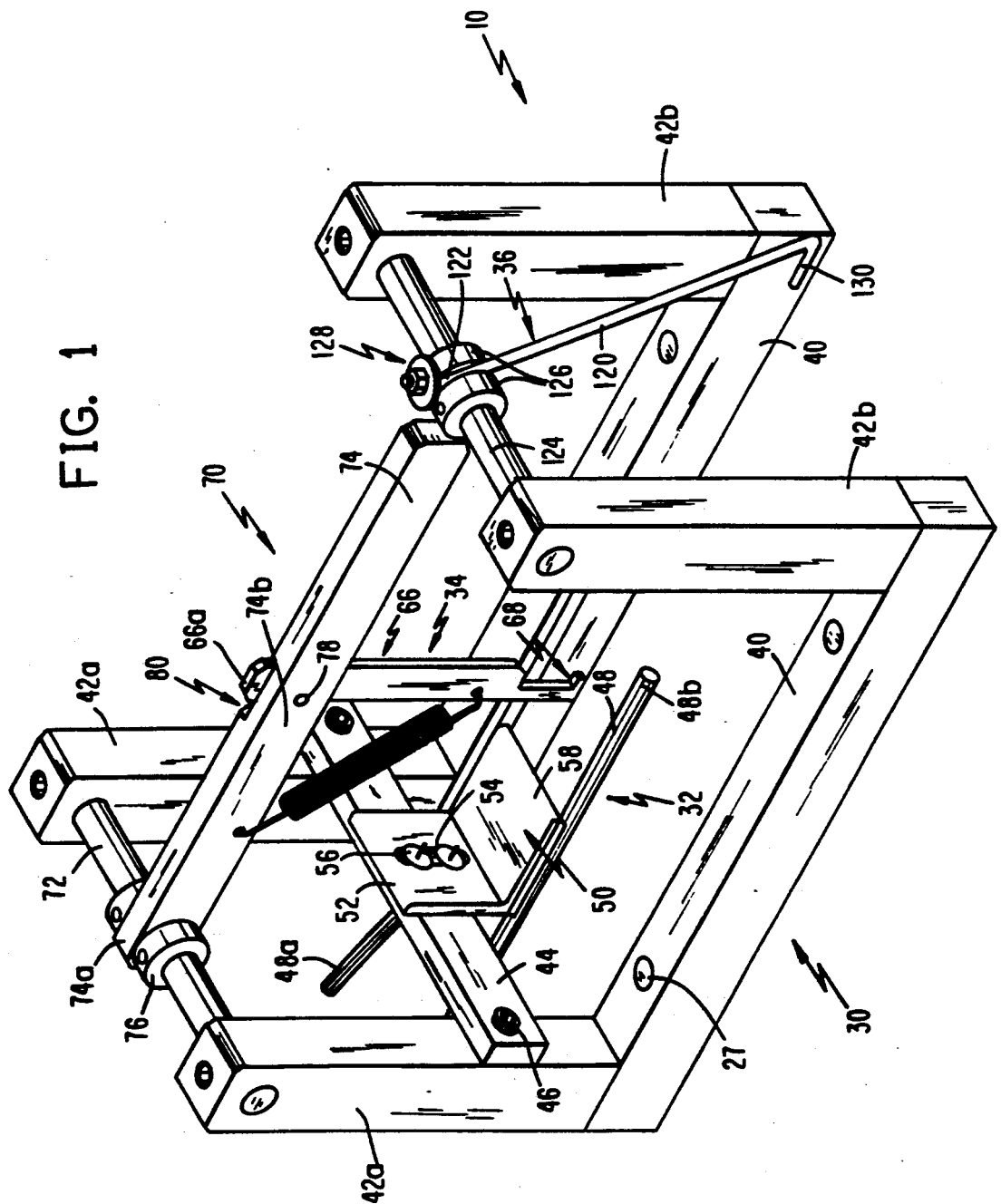
FIG. 1 is a perspective view of a reversed can end ejection system according to the present invention.

FIGS. 1-6 depict a reversed end ejector system 10 for detecting and ejecting dissimilar or disoriented can ends 12' from a set of ends 12 moving along a conveyor path C. Such ends 12,12' are typically manufactured from metal stock which is cut into circular blanks and formed between upper and lower reciprocating die assemblies in a known type of end-making machine. With reference to FIGS. 3A-5A, for example, the circular ends 12,12' are each formed with a center panel 14 of circular shape having an upper surface 14a and a formed peripheral edge 16 consisting of a countersink radius lip 16a extending below the center panel 14 and a seaming panel 16b extending upwardly from the center panel. These can ends 12 travel in a nested stack along a conveyor system 18 which may be comprised of a pair of spaced, parallel L-shaped guide rails 20 (FIG. 2A) in which a pair of urethane rods 22 are respectively disposed to support each end in the nested stack a long two circumferentially spaced points of contact. In the depicted embodiment, the reversed end extractor system 10 is interposed in the path of conveyance C so as to detect and eject reversely oriented can ends 12' from the otherwise properly oriented and nested stack of can ends 12.

The stack of nested can ends 12, when properly oriented, results in a substantially solid, generally cylindrical exterior ridged surface as indicated generally by reference numeral 24. The ridges 26 are spaced from each other by a distance D (see, e.g., FIG. 2). However, when one can end 12' is reversely oriented with respect to the stack such as depicted in FIGS. 3 and 3A, it abuts oppositely facing surfaces of the adjacent can ends 12 in the stack which results in peripheral gaps along the otherwise solid cylindrical surface, as indicated generally at reference numeral 29. This peripheral gap 29 is roughly equal to twice the height of the formed end as measured from the bottom of the countersink 16a to the uppermost part of the seaming panel 16b, minus twice the height of the downwardly depending outermost peripheral seaming flange 16c adapted to be attached to the peripheral flange of the can. It is important to detect and eject these reversely oriented can ends 12' from the conveyor system 18 prior to reaching the end of the conveyor and the point of assembly with a can or other container body. Thereby, the ejection system 10 of this invention is advantageously interposed at a convenient location along the path of travel C contiguous with the conveyor system itself. As will be seen below, the ejection system 10 of this invention requires little if any modification to the existing conveyor system 18.

Reversed end extractor 10 of the present invention comprises three sub-assemblies 32, 34 and 36 mounted to a common support frame 30 straddling the nested end column. The first sub-assembly is a guide rod unit 32 which guides any reversed ends 12' that have slipped up in the stack 24 back into co-elevational alignment with the properly oriented (i.e., non-reversed) ends 12. The second sub-assembly is a primary extractor hook 34 adapted to ride on the uppermost surfaces or ridges 26 of the stack 24. If a reversed end 12' is present, the hook 34 drops under its own weight into the gap 29 formed between the adjacent peripheral flanges 16c of a reversed and non-reversed end 12,12' to engage the peripheral edge of the reversed end. Continued conveyance of the stack 24 enables the hook 34 to lift and remove the reversed end 12' from the stack in the unique manner described below. In the event the primary hook 34 inadvertently releases the reversed end 12' after partially withdrawing it from the stack 24, a secondary or backup hook (third sub-assembly) 36, pivotally mounted to the support frame 30, is adapted to catch and pull the reversed end 12' from the stack.

Figure 2:
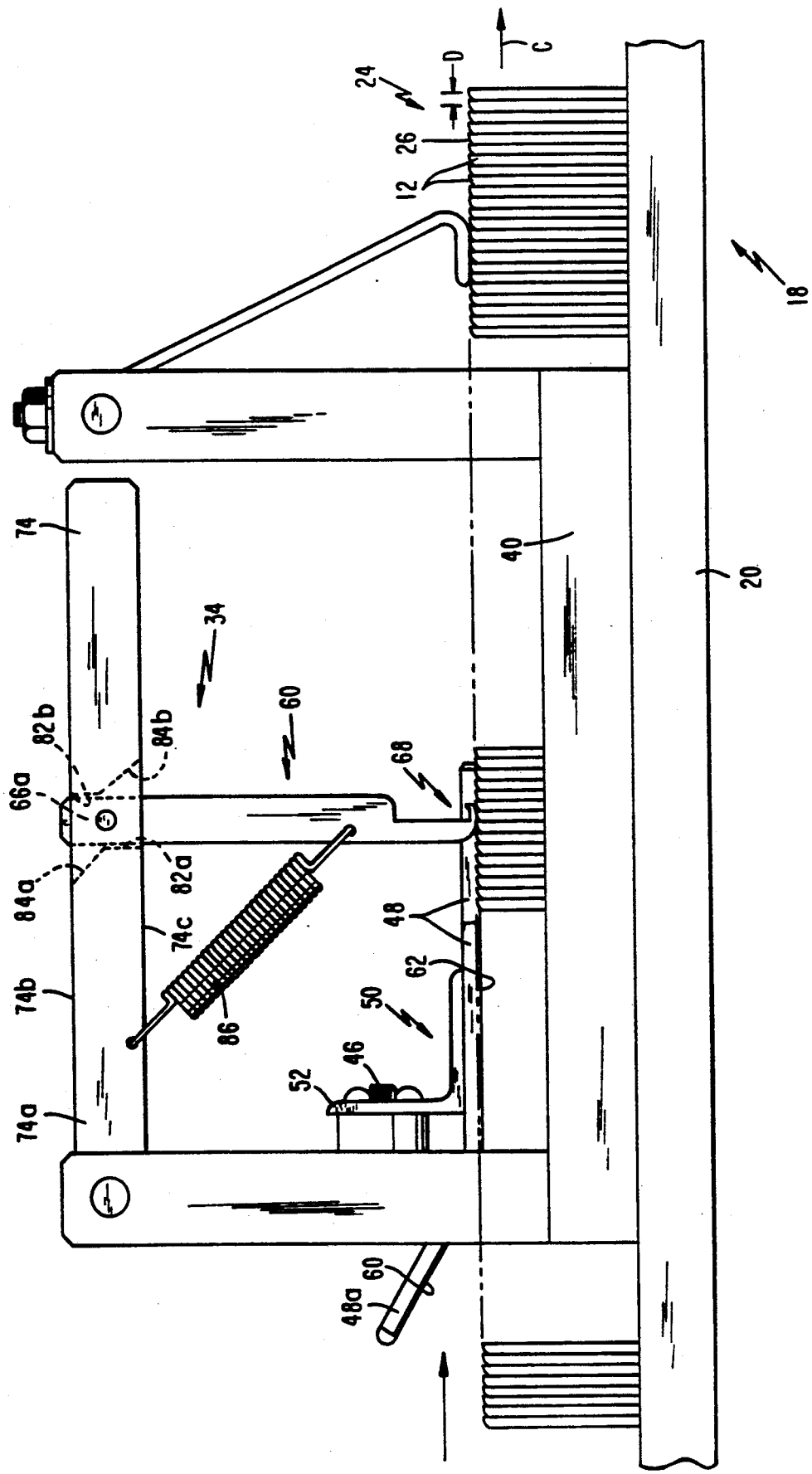
FIG. 2 is a side elevational view of the ejection system of FIG. 1.
Figure 2A:
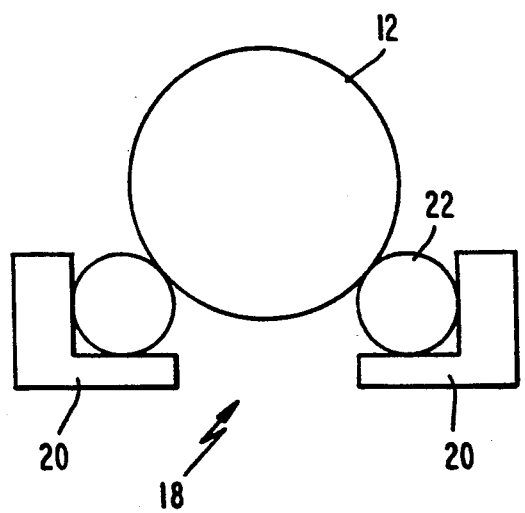
FIG. 2A is a cross-sectional elevational view of an existing conveyor system for supporting the stack of can ends.
Figures 3, 3A:
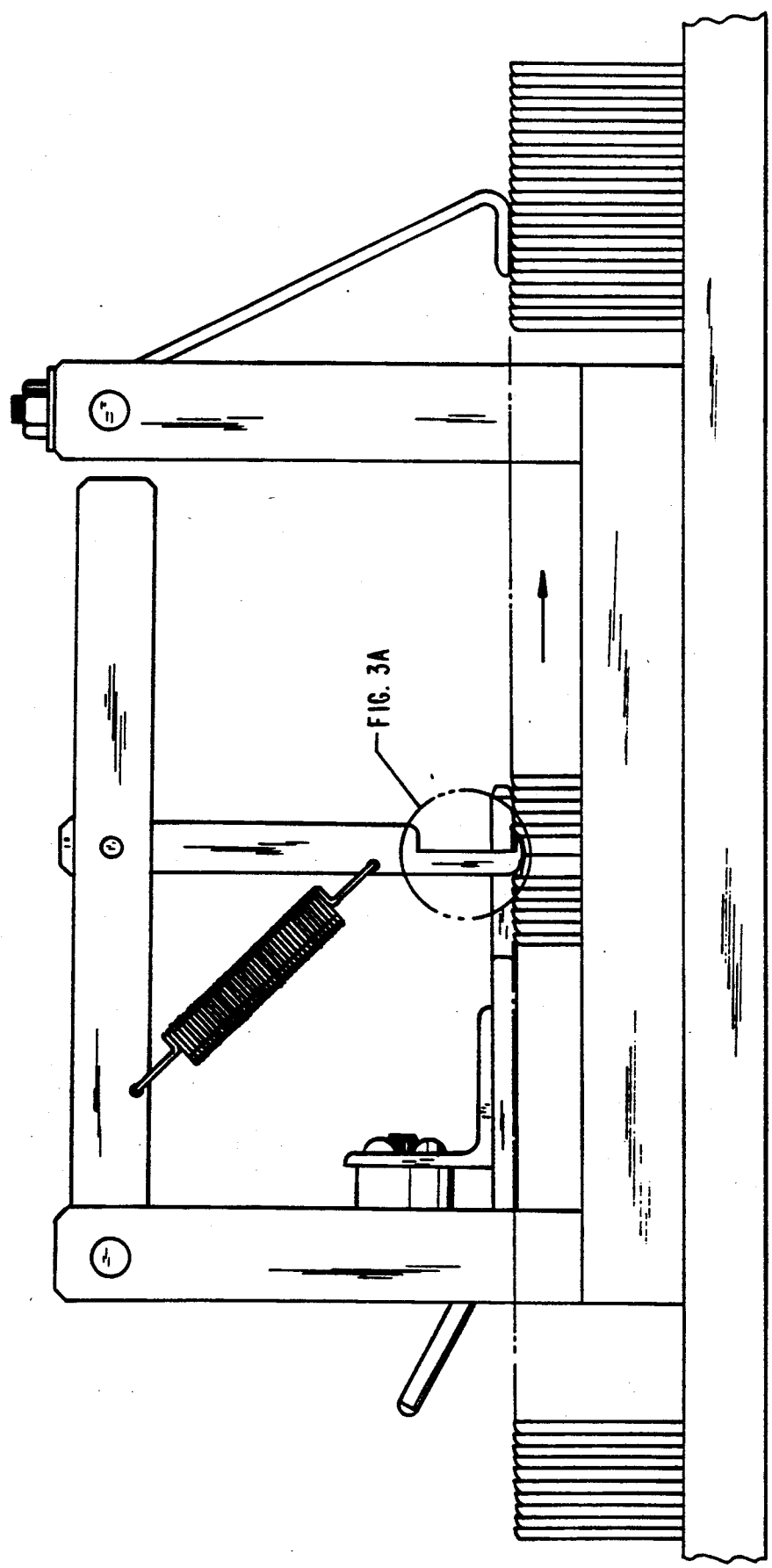
FIG. 3 is a side elevational view depicting detection of a reversed end with the ejection system of the invention.
FIG. 3A is an enlarged detailed sectional view depicting the relative location of a hooked end of the ejection system relative to the reversed end upon initial detection of said peripheral gap.
Figure 3A:
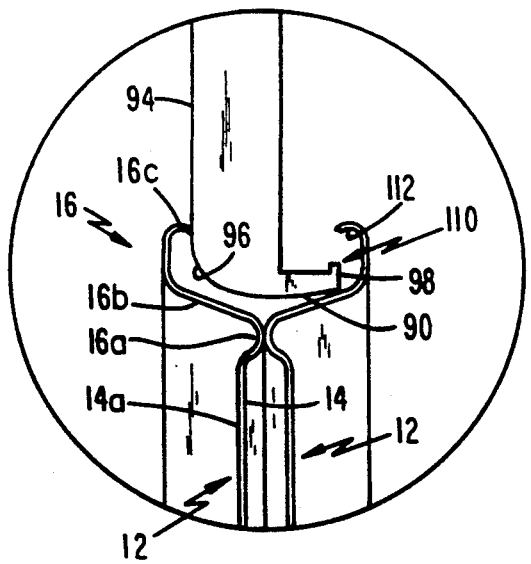

The support frame 30 comprises a pair of spaced, parallel lower support members 40 that may either straddle the conveyor 18 or, as depicted in FIGS. 1 and 2, may be bolted through holes 27 to the upper surfaces of the guide rails 20 supporting the stack support rails 22. A pair of generally identical vertical mounting posts 42a and 42b are attached to project upwardly from opposite ends of each horizontal support member 40 to define a first set or pair (upstream) and a second set or pair (downstream) of mounting posts spaced on opposite sides of the conveyor 18 at corresponding locations.

The upstream set of vertical mounting posts 42a,42b are interconnected at their intermediate portions with a horizontal cross bar 44 secured at opposite ends thereof to the posts with screws 46. This cross bar 44 supports the guide rod unit 32 which is comprised of a pair of guide rods 48, each formed with a leading end 48a which is upwardly inclined towards the oncoming stack 24 and a horizontal downstream section 48b extending parallel to the stack 24. The guide rods 48 are mounted in spaced, parallel relation to each other on opposite sides of the longitudinal axis of the conveyor line 18 by means of an L-shaped mounting bracket 50. The first or vertical leg 52 of the bracket 50 includes an elongate, vertically extending height adjustment slot 54 and is screwed to the cross brace 44 with two screws 56 extending through the slot. The second or horizontal mounting leg 58 of the bracket 50 extends rearwardly of the cross brace 44 in the downstream direction of conveyance and each longitudinally extending guide rod 48 is secured to the bottom surface of the horizontal bracket portion 58 such as by welding.

In operation, the mounting bracket 50 is elevationally adjusted so that there is slight clearance (e.g., 1/32 inches) between the bottom surfaces of each guide rod 48 with the stack 24. The upwardly inclined leading ends 48a of the guide rods define a pair of inclined guide surfaces 60 which begin at a point well above the stack 24 (as best depicted in FIG. 2) and are inclined downwardly in the direction of conveyance to intersect the horizontal guide surfaces 62. Thus, in the event that one of the ends (reversed or non-reversed) 12,12' sticks up from the stack 24, upper surfaces of the end will contact the inclined guide surfaces 60 of the guide rod unit during conveyance. As the lifted end is conveyed beneath the inclined leading guide rod sections 48a, it is pushed downwardly back into place into proper elevation with the remainder of the stack 24. This proper elevational repositioning is assured by the horizontal guide rod sections 48b.

Each guide rod 48 is preferably formed from cylindrical stock so as to provide smooth guide surfaces 60,62 preventing damage to the formed ends 12,12' during guiding contact therewith. Further, the feature of mounting the guide rod unit 32 to the support frame 30 with a height adjustable mounting bracket 50 enables the guide rod unit to be easily raised or lowered for utilization with stacks of identical ends respectively manufactured to a different diameter.

The primary extractor hook 34 for removing reversed ends 12' from the stack 24 includes a vertical extractor bar 66 having a lower hooked end 68 with the hook facing rearwardly to avoid catching on the peripheral flange 16c of non-reversed ends 12. The hooked bar 66 is suspended from an overhead mounting assembly 70 to enable hook 68 to ride on the uppermost surfaces or ridges 26 of the stack 24 at a position proximate or downstream from the guide rod unit 32, i.e., after all ends 12,12' have been positioned in co-elevational alignment by the guide rods 48. The overhead assembly 70 comprises a horizontal, transverse mounting shaft 72 rotatably mounted, at opposite ends thereof, to the upper ends of the upstream set 42a of mounting posts. One end (leading) 74a of an end hook mounting bar 74 is secured to the mounting shaft 72 with a bushing (not shown) and extends longitudinally in the direction of conveyance to support the end hook 68 in proper position. The mounting bar 74 therefore extends longitudinally in a vertical plane coplanar with the central longitudinal axis of the conveyed stack 24. The mounting bar 74 is maintained in this plane with a pair of set collars 76 engaging opposite side surfaces of the leading end 74a of the bar.

The upper end 66a of the extractor bar 66 is pivotally secured to an intermediate portion 74b of the end hook mounting bar 74 with a pin 78. More specifically, as best depicted in FIGS. 1 and 2, this upper end 66a is disposed within a slot 80 formed in one side surface of the mounting bar 74. The slot 80 is defined by a first pair of offset vertical side walls 82a and 82b respectively intersecting bottom and top edges 74c and 74d of the mounting bar and spaced from each other by a distance equal to the width of the bar 66. These vertical slot walls 82a and 82b extend from the associated edge 74c or 74d for a distance equal to about half the height of bar 74 and are respectively intersected by a second pair of offset slot side walls 84a and 84b (respectively intersecting edges 74d,74c) which are parallel to each other and inclined at a predetermined angle to the vertical walls 82a,82b.

The pivot axis of pin 78 is centered between the slot walls 82a,82b, 84a,84b. With reference to FIGS. 1 and 2, the extractor bar 66 is normally biased into vertical position against the vertical slot walls 82aand 82b with a tension spring 86 having opposite ends respectively connected to a portion of the mounting bar 74 intermediate the leading end 74a and the slot 80 and a lower portion of the extractor bar 66 located above the hooked end 68.

Figure 7:
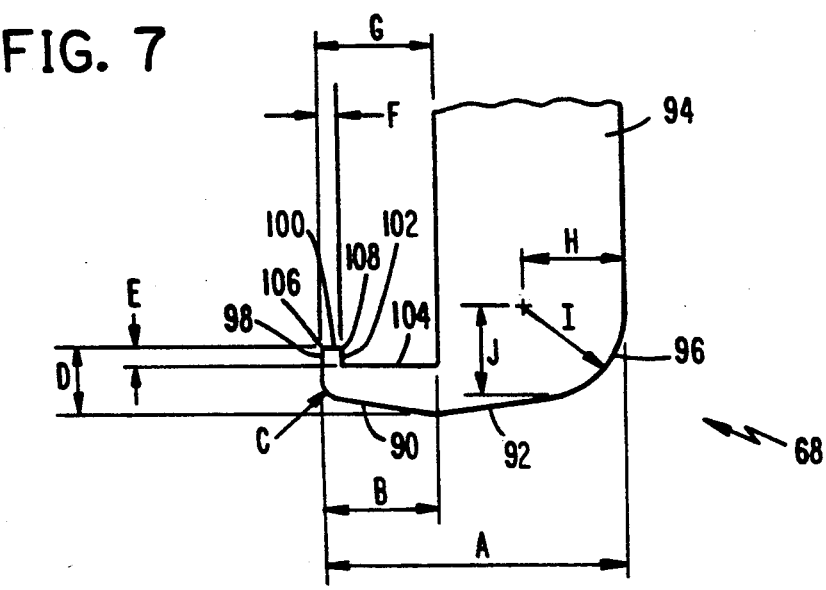
FIG. 7 is a detailed cross-sectional view of a commercial embodiment of a hooked end according to the present invention.

With reference to FIG. 7, the hooked end 68 is defined by a generally V-shaped bottom surface having oppositely inclined surfaces 90 and 92 each forming an angle of about 9° to the horizontal. The leading bottom surface 92 intersects the vertical leading edge surface 94 of the bar 66 at a rounded exterior corner as at 96. It is this rounded corner 96 and leading bottom surface 92 which normally rides on the stack 24 of non-reversed ends 12.

The hooked end 68 itself extends upwardly from the uppermost portion of the trailing bottom surface 90 and is defined by a short vertical wall 98 establishing the rearwardmost or trailing end of the hook. This short vertical wall 98 intersects a horizontal wall 100 projecting forwardly therefrom, i.e., in the upstream direction. The hook 68 is completed by a second short vertical wall 102 intersecting a horizontal wall 104 extending forwardly therefrom in the upstream direction. These short vertical surfaces 98,102 define sharp corners 106 and 108 at their respective points of intersection with surface 100 and jointly define a toe 110 adapted to engage the undercurl 112 of the peripheral edge 16c of the reversed end 12' in the manner described more fully below.

In one commercial embodiment of this invention, the following dimensions may comprise the hooked end 68:

Dimension A = .360 inches
Dimension B = 9/64 inches
Dimension C = .005 inches radius
Dimension D = .085 inches
Dimension E = .020 inches
Dimension F = .020 inches
Dimension G = .145 inches
Dimension H = ⅛ inches radius
Dimension I = ⅛ inches radius
Dimension J = ⅛ inches As can best be seen from FIG. 3A, the overall width (measured between surfaces 94 and 98) of the hooked end 68 is less than the distance between the gap 29 defined by the adjacent peripheral flanges 16c of a non-reversed end 12 and a reversed end 12' within the stack 24. This overall width, however, is greater than the distance between the adjacent undercurls of a pair of non-reversed ends.

In operation, therefore, the hooked end 68 normally rides under its own weight on the ridges 26 formed by the flanges 16c of the stacked conveyed ends. The hook 68 is maintained in proper orientation by the tension spring 86, i.e., so that the longitudinal axis of the extractor bar 66 is perpendicular to the stack 24 and maintained so by the vertical side walls 82a,82b of the slot 80 as depicted in FIG. 2. FIG. 2 therefore depicts the normal operating condition when there are no reversed ends 12' in the stack 24 engaging the hooked end 68.

In FIGS. 3 and 3A, as the flange 16c of a reversed end 12' clears the trailing bottom surface 90 of the hook 68, the hook drops into the gap 29 between the non-reversed and reversed end peripheral flanges under the weight of the reversed end extraction bar 66.

As the ends continue to move, the toe 110 of the hooked end is rotated counter-clockwise into engagement with the undercurl 112 of the reversed end 12' (FIGS. 4 and 4A) as a result of the pushing force exerted by the undercurl 112' of the next-in-line end 12 against surface 94. This action, together with this pushing force exerted by the undercurl 112' of the next-in-line, non-reversed end 12 acting against the leading vertical surface 94 of the extraction bar 66, causes the corner 102 to wedge against the undercurl. Once the toe 110 locks with the undercurl 112 as a result of the aforesaid wedging contact, the extraction bar 66 will pivot counter-clockwise about its pivot 78 with the mounting bar 74 which in turn is pivoted clockwise about its mounting shaft 72.

Figure 4A:
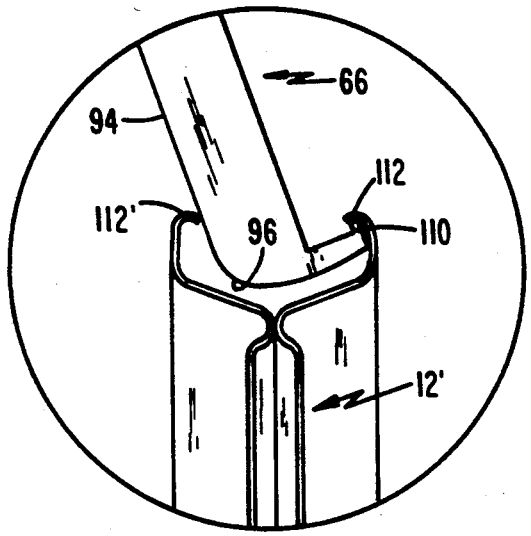
FIG. 4A is a detailed cross-sectional view depicting the precise positioning of the hooked end of the ejection system relative to the reversed end.
Figure 5A:
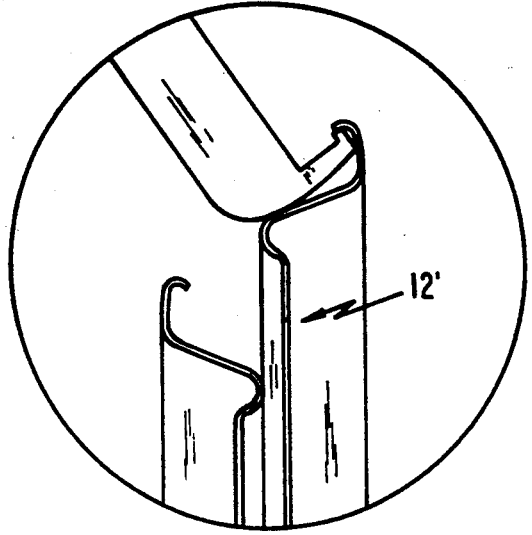
FIG. 5A is a detailed cross-sectional view depicting the relative movement of the hooked end with the reversed end.
Figure 6:
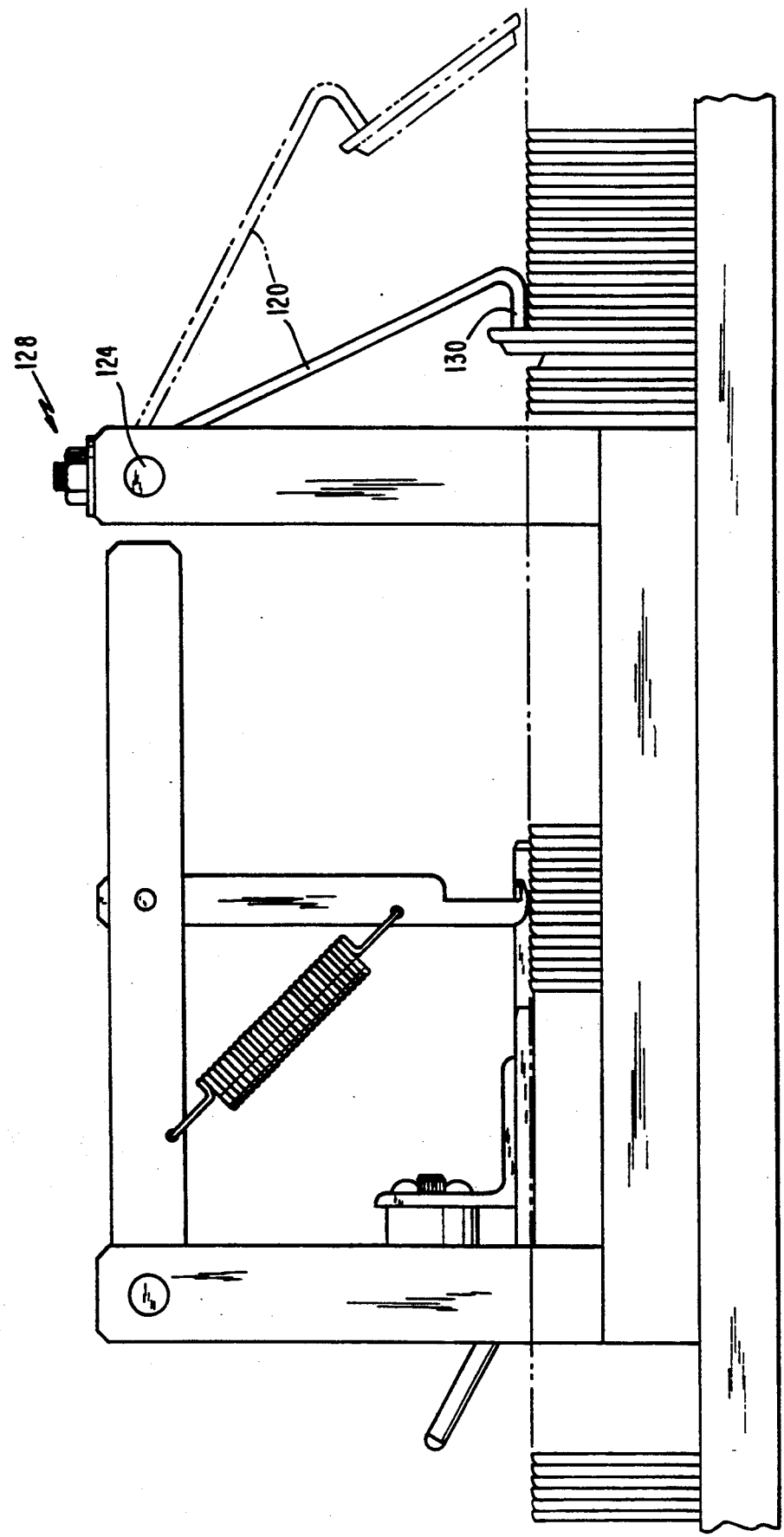
FIG. 6 is a side elevational view depicting removal of the reversed end with the secondary extraction hook.

As the reversed end 12' continues to move downstream with the stack 24 from the position of FIGS. 4,4A to that of FIGS. 5,5A, the pivoting extraction bar 66 engages the inclined surfaces 84a,84b of the control slot 80 which prevents further pivoting action of the extraction bar 66 relative to the mounting bar 74. When this occurs, the reversed end 12' is partially raised by the now captive extraction bar 66 as depicted by solid lines in FIG. 5. As a result of the interlocking arrangement between the toe 110 and undercurl 112 of the reversed end 12', the mounting bar 74 now pivots in the counter-clockwise direction (into the phantom line position), causing the reversed end to become fully extracted from the stack 24. When this occurs, the end 12' tends to fall off the hooked end 68 and the tension spring 86 quickly restores the hook back to its normal operating position of FIG. 2.

In the event that the primary extraction hook 68 does not interlock with the undercurl 112 of the reversed end 12' and therefore releases the undercurl before extracting the reversed end, there is provided the secondary extraction hook 36 disposed downstream from the primary hook 66. The secondary extraction hook 36 includes a rod 120 having an upper end formed with an arcuate portion 122 which is wrapped around a mounting shaft 124 having opposite ends rotatably secured to the second or trailing set 42b of mounting posts. This secondary hook 36 is maintained in the same vertical plane containing the primary hook 66 by means of a pair of set collars 126 mounted to the shaft 124. The secondary hook is prevented from slipping up over the mounting shaft (i.e., in the counter-clockwise direction) by means of a screw and flat washer/nut arrangement 128 as depicted in FIG. 1.

The rod 120 is dimensioned so as to be downwardly inclined from the overhead mounting shaft 124 in the direction of conveyance. Projecting forwardly from the lower end of this downwardly inclined rod 120 is a forwardly extending rod section 130 which is adapted to extend horizontally and ride on the peripheral ridges 26 of the stack 24 during normal operation as depicted in FIG. 2.

In the event the primary extraction hook 66 has failed to completely dislodge a reversed end 12' from the stack 24, this reversed end is usually nonetheless lifted into the solid line raised position depicted in FIG. 5 before the toe 110 unlatches from the undercurl 112. As the partially lifted reversed end 112' continues to travel in the direction of conveyance, the countersink 16a has thereby been elevated to engage the secondary hook, i.e., the leading end 132 of rod section 130. Further continued travel of the reversed end 12', once engaged by the secondary hook 130, causes the end to be completely lifted and removed from the stack as depicted in the phantom line position of FIG. 6.

The reversed end extraction system 10 of this invention thus provides an uncomplicated and reliable means for detecting the presence of reversed ends 12' without resort to expensive and complicated optical and electronically controlled extraction mechanisms. Of course, if desired, system 10 may be used in conjunction with such other systems. Extraction system 10 of this invention may be easily added to existing conveyorized equipment with little or no modification.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A method of ejecting a can end in reverse orientation from a moving stack of otherwise similarly aligned and nested non-reversed ends, wherein said ends, when properly nested, each has an outermost peripheral surface which results in a stack having a cylindrical exterior ridged surface and wherein a reversely oriented end has an outermost peripheral surface which results in a peripheral gap with an adjacent end, comprising the steps of:
    (a) detecting a peripheral gap between a reversed end and an adjacent, non-reversed end;
    (b) inserting a hook into said peripheral gap to engage a peripheral flange of said reversed end; and
    (c) removing said reversed end from said stack via hooked engagement between said hook and peripheral flange.

2. The method of claim 1, wherein continued movement of said stack during said hooked engagement causes the hook to lift and remove the reversed end from the stack.

3. The method of claim 2, comprising the further step of detecting the presence of a reversed end in an elevated position relative to the stack and engaging a countersunk lip region of the reversed end with a second hook to completely lift and remove said reversed end from the stack.

4. A reversed can end ejection system for ejecting a can end in reverse orientation relative to a moving stack of otherwise similarly aligned and nested ends, wherein said ends, when properly nested, each has an outermost peripheral surface which results in a stack having a cylindrical exterior ridged surface and wherein a reversely oriented end has an outermost peripheral surface which results in a peripheral gap with an adjacent end, comprising:
    (a) a support frame;
    (b) reversed end extraction hook means mounted to said support frame and normally disposed to contact said outermost peripheral surface of generally each said end in said stack during normal conveyance of said stack, including any said peripheral gap; and
    (c) means for enabling said hook means to enter said peripheral gap and contact a portion of said reversed end in hooked engagement, whereby continued movement of said stack during said hooked engagement causes the hook means to lift and remove the reversed end from the stack.

5. The ejection system of claim 4, further comprising secondary reversed end extractor hook means mounted to the support frame downstream from said reversed end extraction hook means for hooked engagement with a portion of a partially raised reversed end and for lifting same from the stack.

6. The ejection system of claim 4, further comprising guide means connected to the support frame for contacting any reversed or non-reversed ends which are partially raised within the stack and guiding same back to co-elevational alignment with the stack.

7. The ejection system of claim 4, wherein said reversed end extraction hook means includes a hooked bar having a lower hooked end disposed above the stack; and means for mounting said hooked bar to said support frame so that the hooked end rides on said outermost peripheral surfaces.

8. The ejection system of claim 7, wherein said mounting means includes means for enabling the hooked end to drop into the peripheral gap under the weight of the hooked bar.

9. The ejection system of claim 8, wherein said mounting means includes:
    (i) a shaft mounted to the support frame to extend transversely above the stack;
    (ii) an overhead mounting bar means pivotally connected to the shaft and extending rearwardly in the direction of conveyance of said stack; and
    (iii) wherein said hooked bar is pivotally mounted at an upper end thereof to the mounting bar means and projects downwardly towards the stack; whereby said mounting bar means and hooked bar are solely supported on the support frame by said shaft and the weight of said mounting bar means is otherwise supported by contact with the stack.

10. The ejection system of claim 9, wherein said hooked end includes a leading surface constructed to make smooth sliding contact with the exterior ridged surface of said stack and said hook means is formed in a trailing portion of the lower end, said hook means being dimensioned, in the direction of conveyance, to normally ride on the ridged surface but to drop by gravity into the peripheral gap which gap is larger than said hooked dimension.

11. The ejection system of claim 10, wherein said hook means includes a toe having at least one sharp corner adapted to effect a locking and wedging contact with an undercurl in the peripheral flange of the reversed end during continuous advancement of said stack, whereby further advancement causes pivoting movement of said hooked bar relative to said mounting bar and said mounting bar about said shaft to enable lifting and removal of said reversed end from the stack.

12. The ejection system of claim 11, further including control slot means between the point of connection of the hooked bar with the mounting bar means, and spring means connected between said mounting bar means and hooked bar to normally bias the hooked bar against first surfaces of said control slot means so that the hooked bar is generally perpendicular to the stack; said hooked bar being pivotable, in a counter-clockwise direction, through a predetermined angle of rotation, relative to said mounting bar, into contact with second surfaces of said control slot means preventing further rotation of the hooked bar relative to the mounting bar means while enabling further rotation of the hooked bar and mounting bar means as a unit about said shaft to facilitate lifting and removal of said reversed end during further conveyance of said stack.

13. The ejection system of claim 12, further comprising secondary reversed end extractor hook means mounted to the support frame downstream from said reversed end extraction hook means for hooked engagement with a portion of a partially raised reversed end and for lifting same from the stack.

14. The ejection system of claim 13, further comprising guide means connected to the support frame for contacting any reversed or non-reversed ends which are partially raised within the stack and guiding same back to co-elevational alignment with the stack.

15. The ejection system of claim 5, further comprising a shaft mounted to the support frame to extend transversely above the stack, said secondary reversed end extraction hook means being pivotally mounted at an upper end thereof to said shaft.

16. The ejection system of claim 15, wherein said secondary reversed end extraction hook means includes a first rod portion which is rearwardly and downwardly inclined in the direction of advancement of said stack and a second rod portion extending forwardly from the lower end of the first rod portion, the forward end of the second rod portion acting as a secondary hook and being normally disposed above the exterior ridged surface of the stack as the second rod portion contacts the surface of the stack in smooth sliding engagement, whereby said secondary hook is engageable with a countersunk lip of a reversed end which is partially raised within the stack and pivotable about said shaft to effect removal of said end.

17. The ejection system of claim 6, wherein said guide means includes at least one guide rod mounted to the support frame to extend longitudinally above the stack, said guide rod including a leading end defining a guide surface which is upwardly inclined in a direction opposite the direction of advancement of said stack and a trailing end defining a guide surface which is spaced slightly above the stack and parallel thereto, whereby any ends which are partially raised above the stack are adapted to contact the inclined guiding surface and be directed thereby downwardly back into co-elevational alignment with the stack.

18. The ejection system of claim 17, further including means for adjusting the height of the said at least one guide rod above the stack.

19. The ejection system of claim 17, further comprising a pair of said guide rods mounted generally parallel to each other to a support bracket, said support bracket being mounted to the support frame with a cross brace extending transversely between a pair of mounting posts on the support frame.

* * * * *